United States Patent [19]

Vail, III et al.

[11] Patent Number: 5,717,334
[45] Date of Patent: Feb. 10, 1998

[54] METHODS AND APPARATUS TO PRODUCE STICK-SLIP MOTION OF LOGGING TOOL ATTACHED TO A WIRELINE DRAWN UPWARD BY A CONTINUOUSLY ROTATING WIRELINE DRUM

[75] Inventors: William Banning Vail, III, Bothell; Steven Thomas Momii, Seattle, both of Wash.

[73] Assignee: ParaMagnetic Logging, Inc., Woodinville, Wash.

[21] Appl. No.: 508,781

[22] Filed: Jul. 28, 1995

Related U.S. Application Data

[63] Continuation-in-part of Ser. No. 83,615, Jun. 28, 1993, Pat. No. 5,570,024, which is a continuation-in-part of Ser. No. 754,965, Sep. 4, 1991, Pat. No. 5,223,794, which is a division of Ser. No. 434,886, Nov. 13, 1989, Pat. No. 5,075,626, which is a continuation-in-part of Ser. No. 89,697, Aug. 26, 1987, Pat. No. 4,882,542, which is a continuation-in-part of Ser. No. 927,115, Nov. 4, 1986, Pat. No. 4,820,989.

[51] Int. Cl.$^6$ .................................................. G01V 3/20
[52] U.S. Cl. .................................................. 324/368
[58] Field of Search .................................. 324/368, 221, 324/323, 366, 357, 354, 347; 73/151, 152

[56] References Cited

U.S. PATENT DOCUMENTS

| | | | |
|---|---|---|---|
| 2,397,255 | 3/1946 | Ennis | 324/368 |
| 2,459,196 | 1/1949 | Stewart | 324/368 |
| 3,568,053 | 3/1971 | Kilpatrick | 324/368 X |
| 4,251,773 | 2/1981 | Cailliau et al. | 324/367 X |
| 4,567,759 | 2/1986 | Ekstrom et al. | 324/355 X |

Primary Examiner—Sandra L. O'Shea
Assistant Examiner—Roger C. Phillips

[57] ABSTRACT

Methods and apparatus are described to produce stick-slip motion of a logging tool within a cased well attached to a wireline that is drawn upward by a continuously rotating wireline drum. The stick-slip motion results in the periodic upward movement of the tool in the cased well described in terms of a dwell time during which time the tool is stationary, the move time during which time the tool moves, and the stroke that is upward distance that the tool translates during the "slip" portion of the stick-slip motion. This method of measurement is used to log the well at different vertical positions of the tool. Therefore, any typical "station-to-station logging tool" may be modified to be a "continuous logging tool", where "continuous" means that the wireline drum continually rotates while the tool undergoes stick-slip motion downhole and measurements are performed during the dwell times when the tool is momentarily stationary. The stick-slip methods of operation and the related apparatus are particularly described in terms of making measurements of formation resistivity from within a cased well during the dwell times when the tool is momentarily stationary during the periodic stick-slip motion of the logging tool.

5 Claims, 9 Drawing Sheets

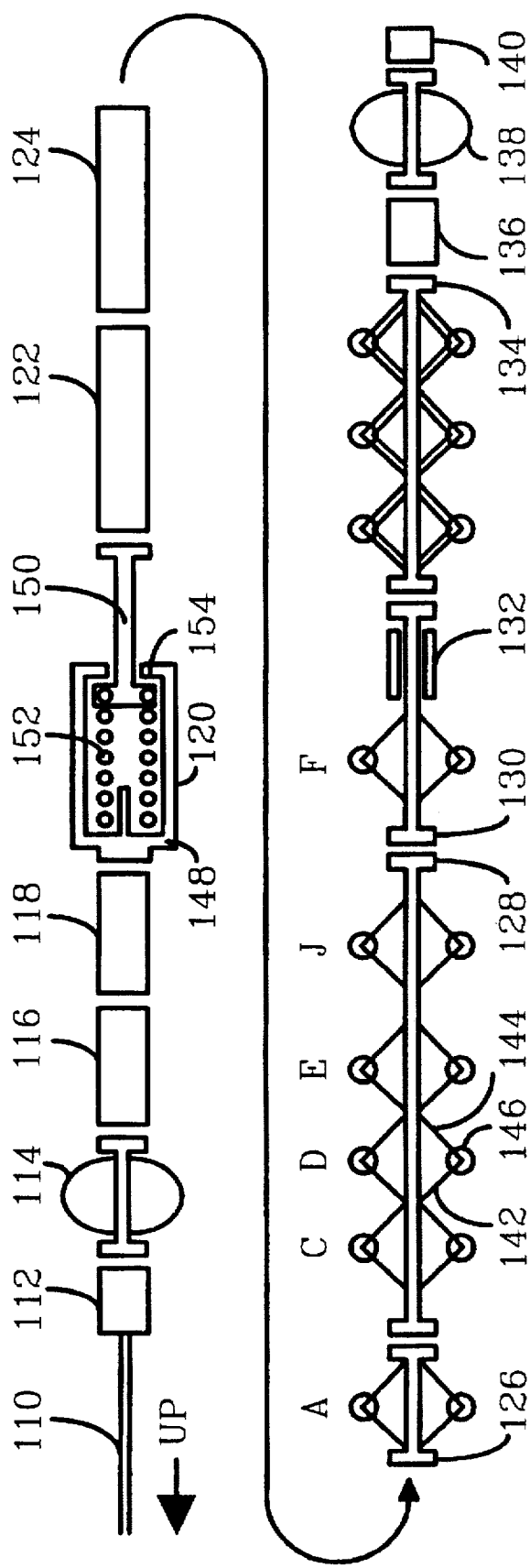
FIG. 8a
FIG. 8b
FIG. 8c 5,717,334

METHODS AND APPARATUS TO PRODUCE STICK-SLIP MOTION OF LOGGING TOOL ATTACHED TO A WIRELINE DRAWN UPWARD BY A CONTINUOUSLY ROTATING WIRELINE DRUM

This application is a Continuation-in-Part Application of an earlier, Continuation-in-Part Application that is entitled "Multiple Electrode Apparatus Compensating for Casing Resistance Differences to Measure Formation Resistivity from Within a Cased Borehole"; which is Ser. No. 08/083,615; and which has a filing date of Jun. 28, 1993, now U.S. Pat. No. 5,570,024 and is included herein by reference.

Ser. No. 08/083,615 is a Continuation-in-Part Application of an earlier Divisional Application that is entitled "Methods of Operation of Apparatus Measuring Formation Resistivity From Within A Cased Well Having One Measurement and Two Compensation Steps"; which is Ser. No. 07/754,965; which has a filing date of Sep. 4, 1991; and that issued on Jun. 29, 1993 as U.S. Pat. No. 5,223,794 {"Vail (794)"}. A copy of Ser. No. 07/754,965 is included herein by reference.

Ser. No. 07/754,965 is a Divisional Application of an earlier Continuation-in-Part Application that is entitled "Electronic Measurement Apparatus Movable In A Cased Borehole and Compensating for Casing Resistance Differences"; which is Ser. No. 07/434,886; which has a filing date of Nov. 13, 1989; and which issued on Dec. 24, 1991 as U.S. Pat. No. 5,075,626 {"Vail(626)"}. Ser. No. 07/434,886 is included herein by reference.

Ser. No. 07/434,886 is a Continuation-in-Part Application of an earlier Continuation-in-Part Application having the title of "Methods and Apparatus for Measurement of Electronic Properties of Geological Formations Through Borehole Casing"; which is Ser. No. 07/089,697; which has the Filing Date of Aug. 26, 1987; and which issued on Nov. 21, 1989 as U.S. Pat. No. 4,882,542 {"Vail(542)"}. A copy of Ser. No. 07/089,697 is included herein by reference.

Ser. No. 07/089,697 is a Continuation-in-Part Application of the original Parent Application having the title "Methods and Apparatus for Measurement of the Resistivity of Geological Formations from Within Cased Boreholes"; which is Ser. No. 06/927,115; which has the Filing Date of Nov. 4, 1986; and which issued on Apr. 11, 1989 as U.S. Pat. No. 4,820,989 {"Vail(989)"}. A copy of Ser. No. 06/927,115 is included herein by reference.

This invention was made with Government support under DOE Grant No. DE-FG06-84ER13294, entitled "Validating the Paramagnetic Logging Effect", Office of Basic Energy Sciences, of the U.S. Department of Energy. The government has certain rights in this invention. The basic concept for the invention described herein was conceived during the funding provided by the above grant.

Ongoing research to measure resistivity through casing has been provided on a co-funded basis from: (a) U.S. Department of Energy Grant No. DE-FG19-88BC14243 entitled "Proof of Feasibility of Thru Casing Resistivity Technology"; (b) U.S. Department of Energy (DOE) Grant No. DE-FG22-90BC14617 entitled "Proof of Concept of Moving Thru Casing Resistivity Apparatus"; (c) U.S. Department of Energy (DOE) Grant No. DE-FG22-93BC14966 entitled "Fabrication and Downhole Testing of Moving Through Casing Resistivity Apparatus"; and (d) Gas Research Institute (GRI) Contract No. 5088-212-1664 entitled "Proof of Feasibility of the Through Casing Resistivity Technology". The government and the GRI have certain rights in this invention. The application herein was filed during periods of time funded by (c) and (d) above.

This invention provides new apparatus and methods of operation to produce stick-slip, or periodic motion of a wireline logging tool in a cased well while the wireline drum of the logging truck continuously winds up the wireline. The invention may be used in any cased well, but will find wide application in oil and gas wells in particular that typically possess steel cased boreholes.

This invention was conceived as a result of work on another invention, namely inventions conceived to measure the resistivity of geological formations from within cased wells. The oil industry has long sought to measure resistivity through casing. Such resistivity measurements, and measurements of other electrochemical phenomena, are useful for at least the following purposes: locating bypassed oil and gas; reservoir evaluation; monitoring water floods; measuring quantitative saturations; cement evaluation; permeability measurements; and measurements through a drill string attached to a drilling bit. Therefore, measurements of resistivity and other electrochemical phenomena through metallic pipes, and steel pipes in particular, are an important subject to the oil industry. Many U.S. patents have issued in the pertinent Subclass 368 of Class 324 of the United States Patent and Trademark Office which address this subject. The following presents a brief description of the particularly relevant prior art presented in the order of descending relative importance.

U.S. patents which have already issued to the inventor in this field are listed as follows: U.S. Pat. No. 4,820,989 (Ser. No. 06/927,115); U.S. Pat. No. 4,882,542 (Ser. No. 07/089, 697); U.S. Pat. No. 5,043,688 (Ser. No. 07/435,273); U.S. Pat. No. 5,043,669 (Ser. No. 07/438,268); U.S. Pat. No. 5,075,626 (Ser. No. 07/434,886); U.S. Pat. No. 5,187,440 (Ser. No. 07/749,136); and U.S. Pat. No. 5,223,794 (Ser. No. 07/754,96). These seven U.S. patents are collectively identified as "the Vail Patents" herein.

The apparatus and methods of operation herein disclosed are embodiments of the Through Casing Resistivity Tool™ that is abbreviated TCRT®. The Through Casing Resistivity Tool™ is a Trademark of ParaMagnetic Logging, Inc. in the United States Patent and Trademark Office. TCRT® is a Registered Trademark of ParaMagnetic Logging, Inc. in the United States Patent and Trademark Office. ParaMagnetic Logging, Inc. has its principal place of business located at 18730—142nd Avenue N.E., Woodinville, Wash. 98072, USA, having the following telephone number: (206) 481-5474.

An important paper concerning the Through Casing Resistivity Tool was published recently. Please refer to the article entitled "Formation Resistivity Measurements Through Metal Casing", having authors of W. B. Vail, S. T. Momii of ParaMagnetic Logging, Inc., R. Woodhouse of Petroleum and Earth Science Consulting, M. Alberty and R. C. A. Peveraro of BP Exploration, and J. D. Klein of ARCO Exploration and Production Technology which appeared as Paper "F", Volume I, in the *Transactions of the SPWLA Thirty-Fourth Annual Logging Symposium*, Calgary, Alberta, Canada, Jun. 13–16, 1993, sponsored by The Society of Professional Well Log Analysts, Inc. of Houston, Tex. and the Canadian Well Logging Society of Calgary, Alberta, Canada (13 pages of text and 8 additional figures). Experimental results are presented therein which confirm that the apparatus and methods disclosed in Ser. No. 07/434,886 that is U.S. Pat. No. 5,075,626 actually work in practice to measure the resistivity of geological formations adjacent to cased wells. To the author's knowledge, the SPWLA paper presents the first accurate measurements of resistivity obtained from within cased wells using any previous experimental apparatus. Page 6 of that paper describes attempts to locate casing collars from the data presented. One collar was clearly located, and another one was missed. Therefore, the data presented in that paper did not present compelling evidence that the TCRT could routinely locate all the casing collars present nor did it provide a methodology to routinely do so in practice. Page 6 of that paper however shows that different weight casings could be identified with the TCRT.

A verbal presentation entitled "Introduction to the Through Casing Resistivity Tool" was made to the Permian Basin Well Logging Society on Mar. 18, 1993.

A theoretical paper of considerable importance was published recently concerning resistivity measurements from within cased wells. It is entitled "Through-Casing Resistivity (TCR): Physics, Resolution, and 3-D Effects" having the authors of L. A. Tabarovsky, M. E. Cram, T. V. Tamarchenko, K. M. Strack and B. S. Zinger, of Atlas Wireline Services presented as Paper "TT", Volume II, in the Transactions of the SPWLA Thirty-Fifth Annual Logging Symposium, Tulsa, Okla., Jun. 19–22, 1994 (hereinafter, Tabarovsky, et. al., 1994).

Other papers have been published relevant to measurements of formation resistivity from within cased wells including the following: (a) a paper entitled "The Electrical Field in a Borehole With a Casing" by A. A. Kaufman, Geophysics, Vol. 55, No. 1, January 1990, p. 29–38; and (b) a paper entitled "A Transmission-Line Model for Electrical Logging Through Casing", Geophysics, Vol. 58, No. 12, December, 1993, p. 1739–1747; (c) a technical report entitled "Final Report to ParaMagnetic Logging, Inc. for Numerical Analysis of D.C. Logging Through Metal Casing", having the authors of H. F. Morrison and C. J. Schenkel, Engineering Geoscience, College of Engineering, University of California, Berkeley, Calif., Nov. 22, 1991; and (d) a dissertation entitled "The Electrical Resistivity Method in Cased Boreholes", Dissertation for Doctor of Philosophy in Engineering: Materials Science and Mineral Engineering in the Graduate Division of the University of California at Berkeley, Berkeley, Calif., May 20, 1991.

Other recent articles appearing in various publications concerning the Through Casing Resistivity Tool and/or the Vail Patents include the following: (a) an article entitled "Electrical Logging: State-of-the-Art" by Robert Maute of the Mobil Research and Development Corporation, in The Log Analyst, Vol. 33, No. 3, May–June 1992 page 212–213; and (b) in an article entitled "Through Casing Resistivity Tool Set for Permian Use" in Improved Recovery Week, Volume 1, No. 32, Sep. 28, 1992.

The Vail Patents describe the various embodiments of the Through Casing Resistivity Tool ("TCRT"). Many of these Vail Patents describe embodiments of apparatus having three or more spaced apart voltage measurement electrodes which engage the interior of the casing, and which also have calibration means to calibrate for thickness variations of the casing and for errors in the placements of the voltage measurement electrodes. The TCRT may be used for casing inspection procedures and to locate casing collars.

U.S. Pat. No. 4,796,186 which issued on Jan. 3, 1989 to Alexander A. Kaufman entitled "Conductivity Determination in a Formation Having a Cased Well" also describes an apparatus having three or more spaced apart voltage measurement electrodes which engage the interior of the casing and which also have calibration means to calibrate for thickness variations in the casing and for errors in the placements of the electrodes. This patent has been assigned to, and is owned by, ParaMagnetic Logging, Inc. of Woodinville, Wash. In general, different methods of operation and analysis are described in the Kaufman Patent compared to the Vail Patents cited above.

U.S. Pat. No. 4,837,518 which issued on Jun. 6, 1989 to Michael F. Gard, John E. E. Kingman, and James D. Klein, assigned to the Atlantic Richfield Company, entitled "Method and Apparatus for Measuring the Electrical Resistivity of Geologic Formations Through Metal Drill Pipe or Casing", predominantly describes two voltage measurement electrodes and several other current introducing electrodes disposed vertically within a cased well which electrically engage the wall of the casing, henceforth referenced as "Gard (518)". However, that patent does not describe an apparatus having three spaced apart voltage measurement electrodes and associated electronics which takes the voltage differential between two pairs of the three spaced apart voltage measurement electrodes to directly measure electronic properties adjacent to formations. Nor does Gard (518) describe an apparatus having at least three spaced apart voltage measurement electrodes wherein the voltage drops across adjacent pairs of the spaced apart voltage measurement electrodes are simultaneously measured to directly measure electronic properties adjacent to formations. Therefore, Gard (518) does not describe the methods and apparatus disclosed in the Vail Patents.

USSR Patent No. 56,026, which issued on Nov. 30, 1939 to L. M. Alpin, henceforth called "Alpin (026)", which is entitled "Process of the Electrical Measurement of Well Casings", describes an apparatus which has three spaced apart voltage measurement electrodes which positively engage the interior of the casing. However, the Alpin (026) does not have suitable calibration means to calibrate for thickness variations of the casing nor for errors related to the placements of the voltage measurement electrodes. Therefore, Alpin (026) does not describe the methods and apparatus disclosed in the Vail Patents.

French Patent No. 2,207,278 having a "Date of Deposit" of Nov. 20, 1972 describes apparatus having four spaced apart voltage measurement electrodes which engage the interior of borehole casing respectively defined as electrodes M, N, K, and L. Various uphole and downhole current introducing electrodes are described. Apparatus and methods of operation are provided that determines the average resistance between electrodes M and L. French Patent No. 2,207,278 further explicitly assumes an exponential current flow along the casing. Voltage measurements across pair MN and KL are then used to infer certain geological parameters from the assumed exponential current flow along the casing. However, French Patent No. 2,207,278 does not teach measuring a first casing resistance between electrodes MN, does not teach measuring a second casing resistance between electrodes NK, and does not teach measuring a third casing resistance between electrodes KL. Various preferred embodiments described in the Vail Patents teach that it is of importance to measure said first, second, and third resistances to compensate current leakage measurements for casing thickness variations and for errors in placements of the voltage measurement electrodes along the casing to provide accurate measurements of current leakage into formation. Further, many embodiments of the Vail Patents do not require any assumption of the form of current flow along the casing to measure current leakage into formation. Therefore, for these reasons alone, French Patent No. 2,207,278 does not describe the methods and apparatus disclosed herein. There are many other differences between various embodiments of the Vail Patents and French Patent No. 2,207,278 which are described in great detail in the Statement of Prior Art for Ser. No. 07/754,965 dated Dec. 2, 1991 that issued as U.S. Pat. No. 5,223,794 on Jun. 29, 1993.

An abstract of an article entitled "Effectiveness of Resistivity Logging of Cased Wells by A Six-Electrode Tool" by N. V. Mamedov was referenced in TULSA ABSTRACTS as follows: "IZV.VYSSH.UCHEB, ZAVEDENII, NEFT GAZ no.7, pp. 11-15, July 1987. (ISSN 0445-0108; 5 refs; in Russian)", hereinafter the "Mamedov (1987)". It is the applicant's understanding from an English translation of that Mamedov (1987) that the article itself mathematically predicts the sensitivity of the type tool described in the above defined French Patent No. 2,207,278. Mamedov (1987) states that the tool described in French Patent No. 2,207,278 will only be show a "weak dependence" on the resistivity of rock adjacent to the cased well. By contrast, many embodiments of the Vail Patents, and the invention herein, provide measurements of leakage current and other parameters which are strongly dependent upon the resistivity of the rock adjacent to the cased well. Therefore, Mamedov (1987) does not describe the methods of measurement described herein.

U.S. Pat. No. 2,729,784, issued on Jan. 3, 1956 having the title of "Method and Apparatus for Electric Well Logging", and U.S. Pat. No. 2,891,215 issued on Jun. 16, 1959 having the title of "Method and Apparatus for Electric Well Logging", both of which issued in the name of Robert E. Fearon, henceforth called the "Fearon Patents" describe apparatus also having two pairs of voltage measurement electrodes which engage the interior of the casing. However, an attempt is made in the Fearon Patents to produce a "virtual electrode" on the casing in an attempt to measure leakage current into formation which provides for methods and apparatus which are unrelated to the Kaufman and Vail Patents cited above. The Fearon Patents neither provide calibration means, nor do they provide methods similar to those described in either the Kaufman Patent or the Vail Patents, to calibrate for thickness variations and errors in the placements of the electrodes. Therefore, the Fearon Patents do not describe the methods and apparatus disclosed herein.

Accordingly, an object of the invention is to provide new apparatus and methods of operation to cause the Through Casing Resistivity Tool within a cased well to execute periodic, stick-slip motion to log a well at different vertical portions, where the TCRT alternatively lurches upward in the well between durations of time when the tool otherwise remains stationary in the well, during which stationary times the TCRT makes measurements of the resistivity of geological formations from within the cased well.

Accordingly, another object of the invention is to provide new apparatus and methods of operation to cause a logging tool within a cased well to execute periodic, stick-slip motion to log a well at different vertical positions, where the logging tool alternatively lurches upward in the well between durations of time when the tool otherwise remains stationary in the well, during which stationary times the logging tool performs measurements from within the cased well.

And finally, it is another object of the invention to provide apparatus and methods of operation to make a "continuous logging tool" from a normally "station-to-station logging tool" by performing measurements during momentarily stationary periods of time while a wireline pulls upward on the logging tool having means to cause stick-slip motion.

FIGS. 8a–8c show a Through Casing Resistivity Tool with a Slider Mechanism installed.

The invention is described in three major different portions of the specification. In the first major portion of the specification, relevant parts of the text in Ser. No. 07/089, 697 {Vail(542)} are repeated herein which describe apparatus defined in FIGS. 1, 3, 4, and 5 and which present relevant theory. The second major portion of the specification quotes relevant parts of Ser. No. 07/434,886 {Vail (626)} that describe the apparatus defined in FIG. 6 and particularly relevant equations used herein. The third major portion of the specification describes new apparatus and methods of operation to cause the Through Casing Resistivity Tool within a cased well to execute periodic, stick-slip motion to log a well at different vertical portions, where the TCRT alternatively lurches upward in the well between durations of time when the tool otherwise remains stationary in the well, during which stationary times the TCRT makes measurements of the resistivity of geological formations from within the cased well. Thereafter, these apparatus and methods are generalized to produce stick-slip motion applicable to other logging tools in the industry that are otherwise station-to-station logging devices.

Figure 1:
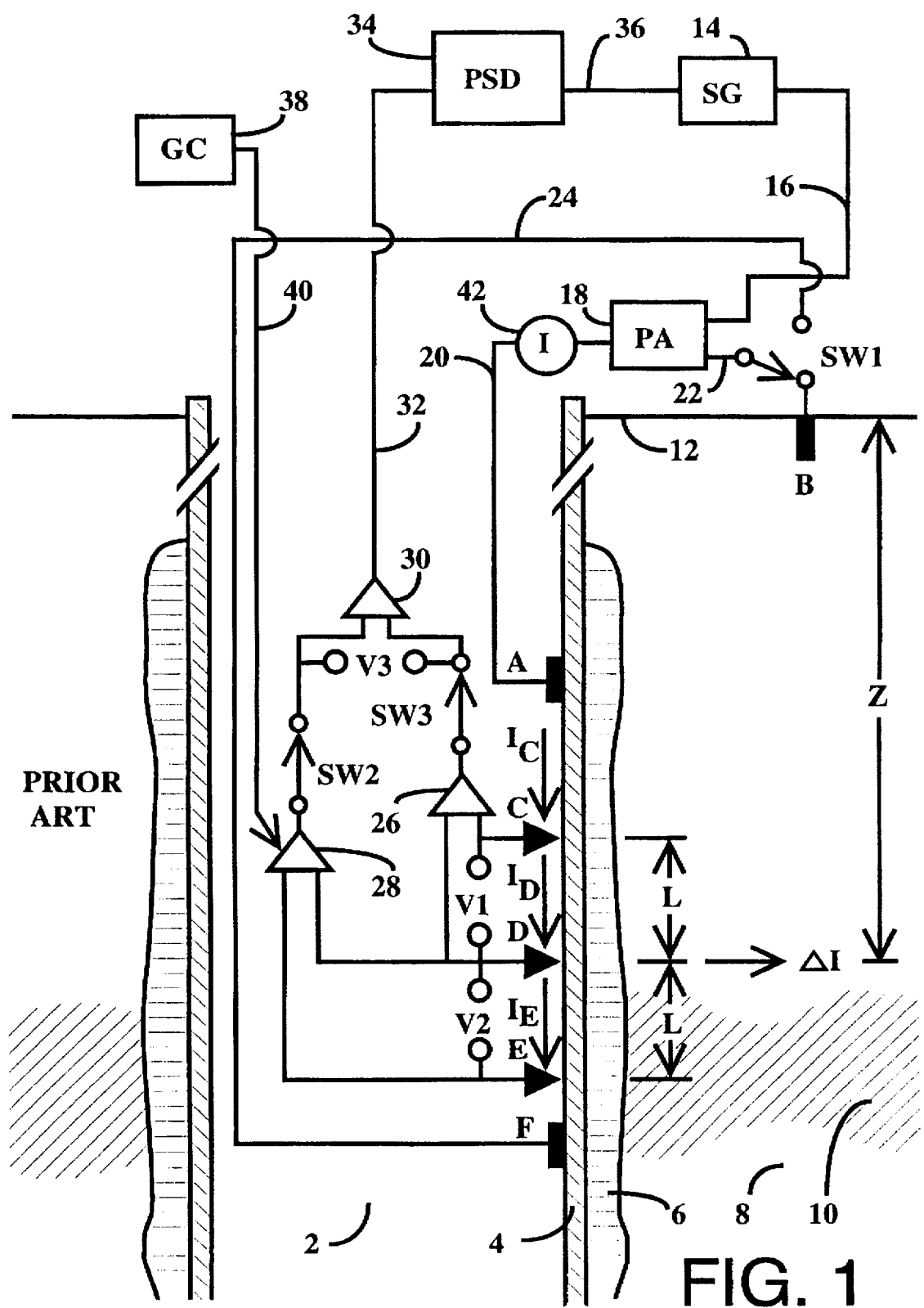
FIG. 1 is a sectional view of one preferred embodiment of the invention of the Through Casing Resistivity Tool (TCRT) which is marked with the legend "Prior Art".

From a technical drafting point of view, FIGS. 1, 2, 3, 4, and 5 in Ser. No. 07/089,697 {Vail(542)} and in those contained in this application are nearly identical. However, the new drawings have been re-done using computer graphics. The following excerpt is taken word-for-word from Ser. No. 07/089,697:

"FIG. 1 shows a typical cased borehole found in an oil field. The borehole 2 is surrounded with borehole casing 4 which in turn is held in place by cement 6 in the rock formation 8. An oil bearing strata 10 exists adjacent to the cased borehole. The borehole casing may or may not extend electrically to the surface of the earth 12. A voltage signal generator 14 (SG) provides an A.C. voltage via cable 16 to power amplifier 18 (PA). The signal generator represents a generic voltage source which includes relatively simple devices such as an oscillator to relatively complex electronics such as an arbitrary waveform generator. The power amplifier 18 is used to conduct A.C. current down insulated electrical wire 20 to electrode A which is in electrical contact with the casing. The current can return to the power amplifier through cable 22 using two different paths. If switch SW1 is connected to electrode B which is electrically grounded to the surface of the earth, then current is conducted primarily from the power amplifier through cable 20 to electrode A and then through the casing and cement layer and subsequently through the rock formation back to electrode B and ultimately through cable 22 back to the power amplifier. In this case, most of the current is passed through the earth. Alternatively, if SW1 is connected to insulated cable 24 which in turn is connected to electrode F, which is in electrical contact with the casing, then current is passed primarily from electrode A to electrode F along the casing for a subsequent return to the power amplifier through cable 22. In this case, little current passes through the earth.

Electrodes C, D, and E are in electrical contact with the interior of casing. In general, the current flowing along the casing varies with position. For example, current $I_C$ is flowing downward along the casing at electrode C, current $I_D$ is flowing downward at electrode D, and current $I_E$ is flowing downward at electrode E. In general, therefore, there is a voltage drop V1 between electrodes C and D which is amplified differentially with amplifier 26. And the voltage difference between electrodes D and E, V2, is also amplified with amplifier 28. With switches SW2 and SW3 in their closed position as shown, the outputs of amplifiers 26 and 28 respectively are differentially subtracted with amplifier 30. The voltage from amplifier 30 is sent to the surface via cable 32 to a phase sensitive detector 34. The phase sensitive detector obtains its reference signal from the signal generator via cable 36. In addition, digital gain controller 38 (GC) digitally controls the gain of amplifier 28 using cable 40 to send commands downhole. The gain controller 38 also has the capability to switch the input leads to amplifier 28 on command, thereby effectively reversing the output polarity of the signal emerging from amplifier 28 for certain types of measurements.

The total current conducted to electrode A is measured by element 42. In the preferred embodiment shown in FIG. 1, the A.C. current used is a symmetric sine wave and therefore in the preferred embodiment, I is the 0-peak value of the A.C. current conducted to electrode A. (The 0-peak value of a sine wave is ½ the peak-to-peak value of the sine wave.)

In general, with SW1 connected to electrode B, current is conducted through formation. For example, current ΔI is conducted into formation along the length 2L between electrodes C and E. However, if SW1 is connected to cable 24 and subsequently to electrode F, then no current is conducted through formation to electrode B. In this case, $I_C=I_D=I_E$ since essentially little current ΔI is conducted into formation.

It should be noted that if SW1 is connected to electrode B then the current will tend to flow through the formation and not along the borehole casing. Calculations show that for 7 inch O.D. casing with a ½ inch wall thickness that if the formation resistivity is 1 ohm-meter and the formation is uniform, then approximately half of the current will have flowed off the casing and into the formation along a length of 320 meters of the casing. For a uniform formation with a resistivity of 10 ohm-meters, this length is 1040 meters instead." These lengths are respectively called "Characteristic Lengths" appropriate for the average resistivity of the formation and the type of casing used. A Characteristic Length is related to the specific length of casing necessary for conducting on approximately one-half the initial current into a particular geological formation as described below.

One embodiment of the invention described in Ser. No. 07/089,697 {Vail(542)} provides a preferred method of operation for the above apparatus in as follows: "The first step in measuring the resistivity of the formation is to "balance" the tool. SW1 is switched to connect to cable 24 and subsequently to electrode F. Then A.C. current is passed from electrode A to electrode F thru the borehole casing. Even though little current is conducted into formation, the voltages V1 and V2 are in general different because of thickness variations of the casing, inaccurate placements of the electrodes, and numerous other factors. However, the gain of amplifier 28 is adjusted using the gain controller so that the differential voltage V3 is nulled to zero. (Amplifier 28 may also have phase balancing electronics if necessary to achieve null at any given frequency of operation.) Therefore, if the electrodes are subsequently left in the same place after balancing for null, spurious effects such as thickness variations in the casing do not affect the subsequent measurements.

With SW1 then connected to electrode B, the signal generator drives the power amplifier which conducts current to electrode A which is in electrical contact with the interior of the borehole casing. A.C. currents from 1 amp o-peak to 30 amps o-peak at a frequency of typically 1 Hz are introduced on the casing here. The low frequency operation is limited by electrochemical effects such as polarization phenomena and the invention can probably be operated down to 0.1 Hz and the resistivity still properly measured. The high frequency operation is limited by skin depth effects of the casing, and an upper frequency limit of the invention is probably 20 Hz for resistivity measurements. Current is subsequently conducted along the casing, both up and down the casing from electrode A, and some current passes through the brine saturated cement surrounding the casing and ultimately through the various resistive zones surrounding the casing. The current is then subsequently returned to the earth's surface through electrode B."

Figure 2:
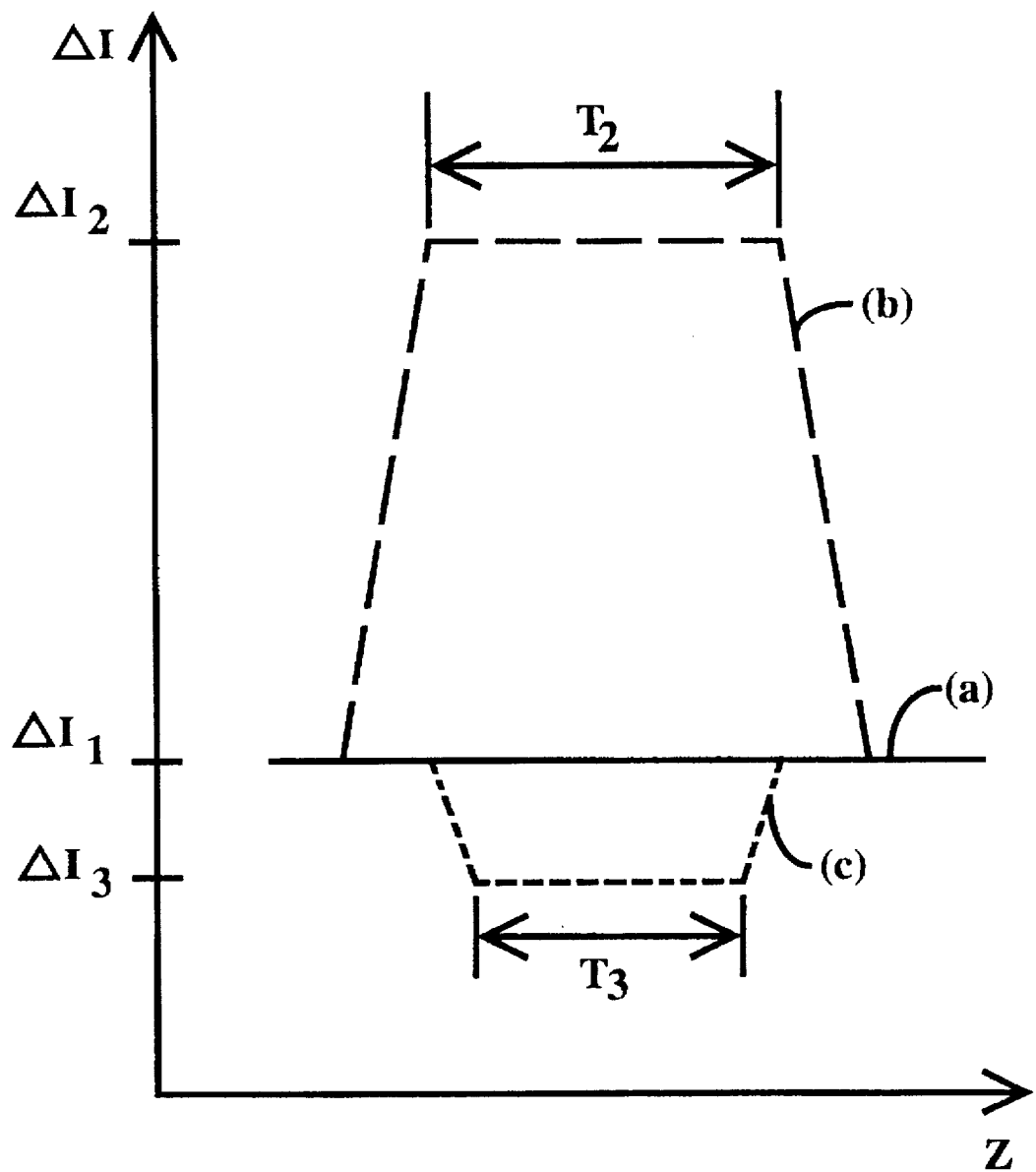
FIG. 2 shows ΔI vs. Z which diagrammatically depicts the response of the tool to different formations which is marked with the legend "Prior Art".

Quoting further from Ser. No. 07/089,697 {Vail(542)}: "FIG. 2 shows the differential current conducted into formation ΔI for different vertical positions z within a steel cased borehole. Z is defined as the position of electrode D in FIG. 1. It should be noted that with a voltage applied to electrode A and with SW1 connected to electrode B that this situation consequently results in a radially symmetric electric field being applied to the formation which is approximately perpendicular to the casing. The electrical field produces outward flowing currents such as ΔI in FIG. 1 which are inversely proportional to the resistivity of the formation. Therefore, one may expect discontinuous changes in the current ΔI at the interface between various resistive zones particularly at oil/water and oil/gas boundaries. For example, curve (a) in FIG. 2 shows the results from a uniform formation with resistivity $\rho_1$. Curve (b) shows departures from curve (a) when a formation of resistivity $\rho_2$ and thickness $T_2$ is intersected where $\rho_2$ is less than $\rho_1$. And curve (c) shows the opposite situation where a formation is intersected with resistivity $\rho_3$ which is greater than $\rho_1$ which has a thickness of $T_3$. It is obvious that under these circumstances, $\Delta I_3$ is less than $\Delta I_1$, which is less than $\Delta I_2$.

Figure 3:
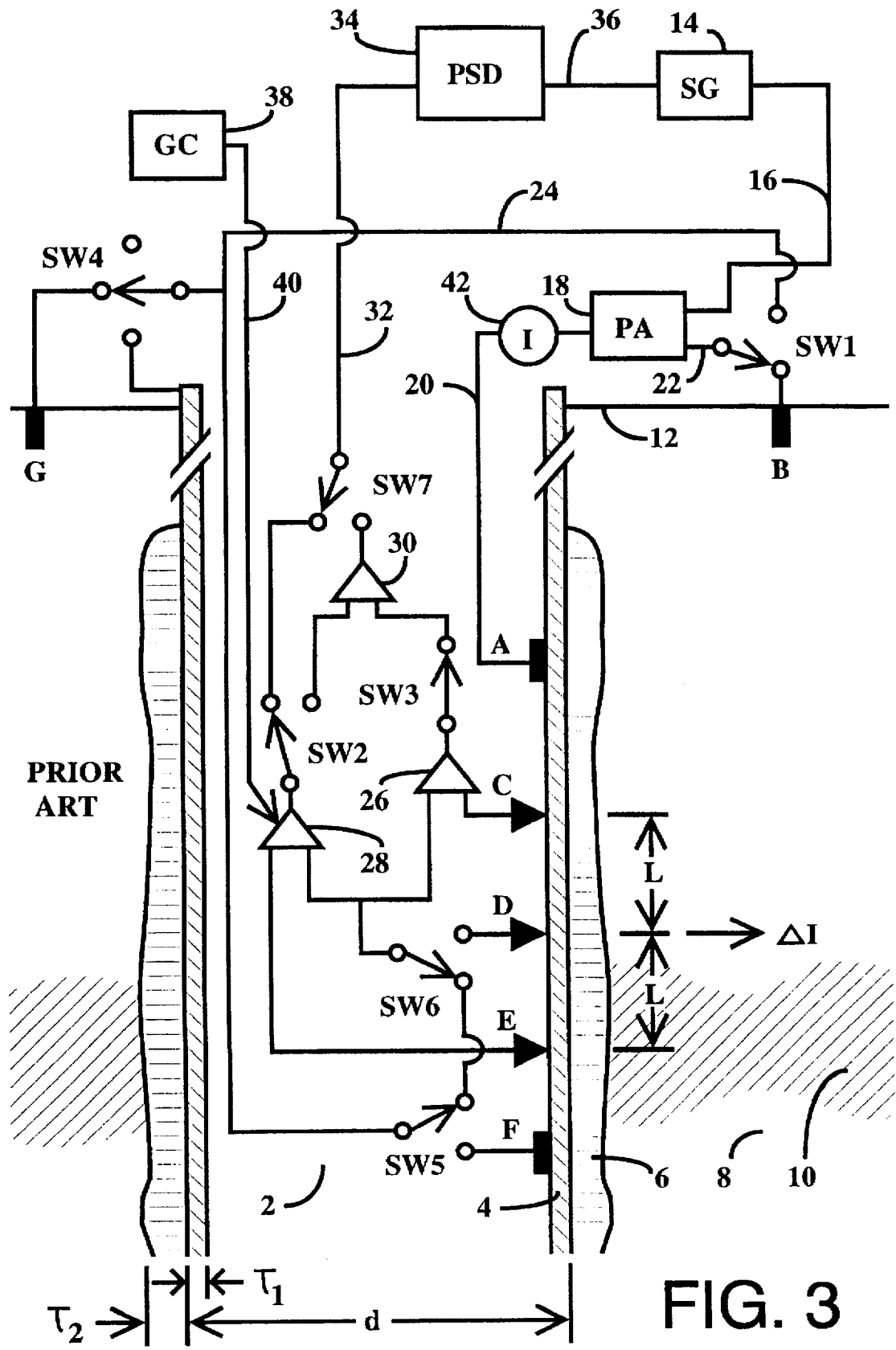
FIG. 3 is a sectional view of a preferred embodiment of the invention which shows how $V_o$ is to be measured that is marked with the legend "Prior Art".

FIG. 3 shows a detailed method to measure the parameter Vo. Electrodes A, B, C, D, E, and F have been defined in FIG. 1. All of the numbered elements 2 through 40 have already been defined in FIG. 1. In FIG. 3, the thickness of the casing is $\tau_1$, the thickness of the cement is $\tau_2$, and d is the diameter of the casing. Switches SW1, SW2, and SW3 have also been defined in FIG. 1. In addition, electrode G is introduced in FIG. 3 which is the voltage measuring reference electrode which is in electrical contact with the surface of the earth. This electrode is used as a reference electrode and conducts little current to avoid measurement errors associated with current flow.

In addition, SW4 is introduced in FIG. 3 which allows the connection of cable 24 to one of the three positions: to an open circuit; to electrode G; or to the top of the borehole casing. And in addition in FIG. 3, switches SW5, SW6, and SW7 have been added which can be operated in the positions shown. (The apparatus in FIG. 3 can be operated in an identical manner as that shown in FIG. 1 provided that switches SW2, SW5, SW6, and SW7 are switched into the opposite states as shown in FIG. 3 and provided that SW4 is placed in the open circuit position.)

With switches SW2, SW5, SW6, and SW7 operated as shown in FIG. 3, then the quantity Vo may be measured. For a given current I conducted to electrode A, then the casing at that point is elevated in potential with respect to the zero potential at a hypothetical point which is an "infinite" distance from the casing. Over the interval of the casing between electrodes C, D, and E in FIG. 3, there exists an average potential over that interval with respect to an infinitely distant reference point. However, the potential measured between only electrode E and electrode G approximates Vo provided the separation of electrodes A, C, D, and E are less than some critical distance such as 10 meters and provided that electrode G is at a distance exceeding another critical distance from the casing such as 10 meters from the borehole casing. The output of amplifier 28 is determined by the voltage difference between electrode E and the other input to the amplifier which is provided by cable 24. With SW1 connected to electrode B, and SW4 connected to electrode G, cable 24 is essentially at the same potential as electrode G and Vo is measured appropriately with the phase sensitive detector 34. In many cases, SW4 may instead be connected to the top of the casing which will work provided electrode A is beyond a critical depth ... ".

Quoting further from Ser. No. 07/089,697 {Vail(542)}: "For the purposes of precise written descriptions of the invention, electrode A is the upper current conducting electrode which is in electrical contact with the interior of the borehole casing; electrode B is the current conducting electrode which is in electrical contact with the surface of the earth; electrodes C, D, and E are voltage measuring electrodes which are in electrical contact with the interior of the borehole casing; electrode F is the lower current conducting electrode which is in electrical contact with the interior of the borehole casing; and electrode G is the voltage measuring reference electrode which is in electrical contact with the surface of the earth.

Furthermore, $V_o$ is called the local casing potential. An example of an electronics difference means is the combination of amplifiers 26, 28, and 30. The differential current conducted into the formation to be measured is $\Delta I$." The differential voltage is that voltage in FIG. 1 which is the output of amplifier 30 with SW1 connected to electrode B and with all the other switches in the positions shown.

Figure 4:
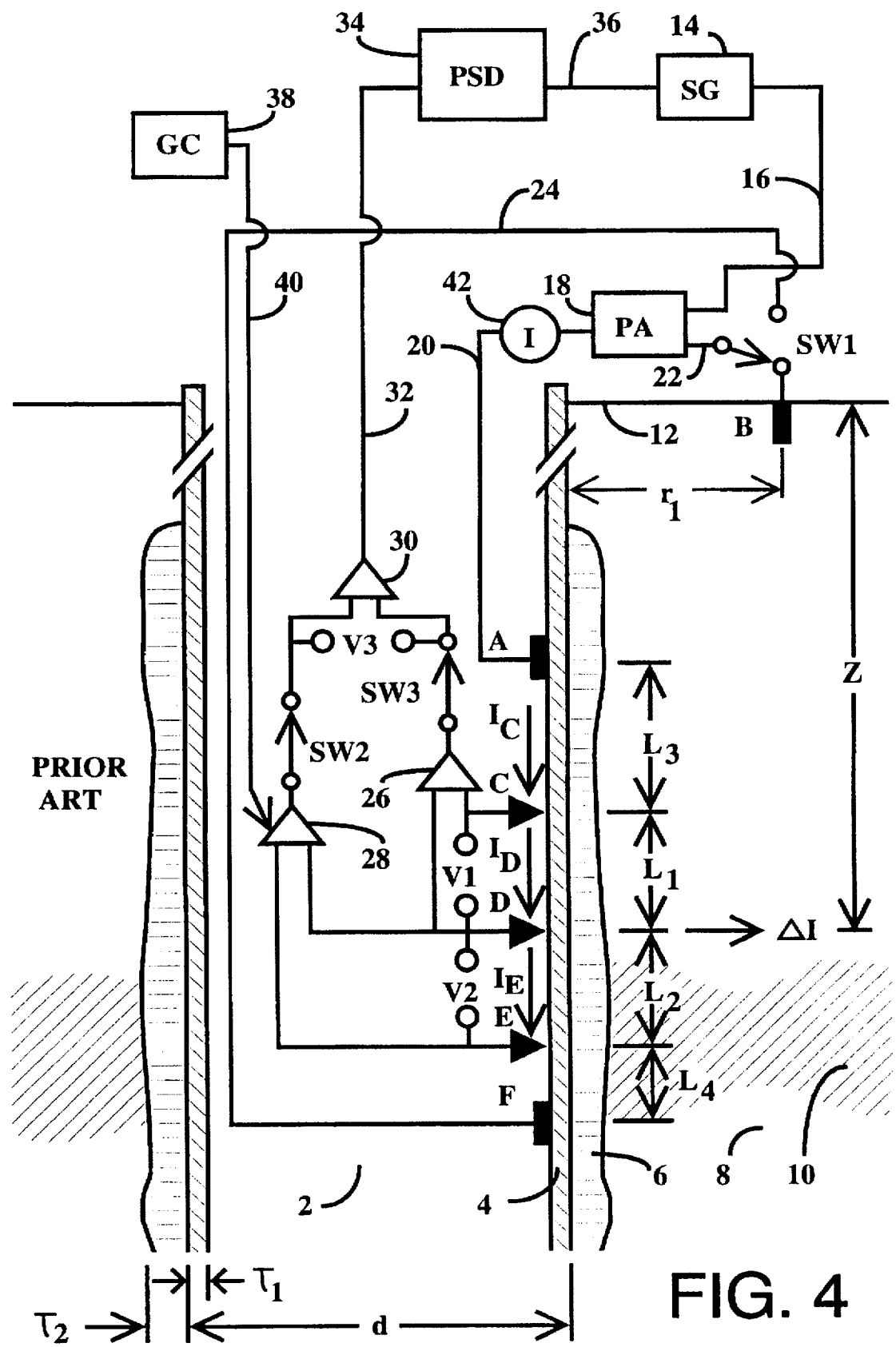
FIG. 4 is a sectional view of an embodiment of the invention which has voltage measurement electrodes which are separated by different distances that is marked with the legend "Prior Art".
Figure 5:
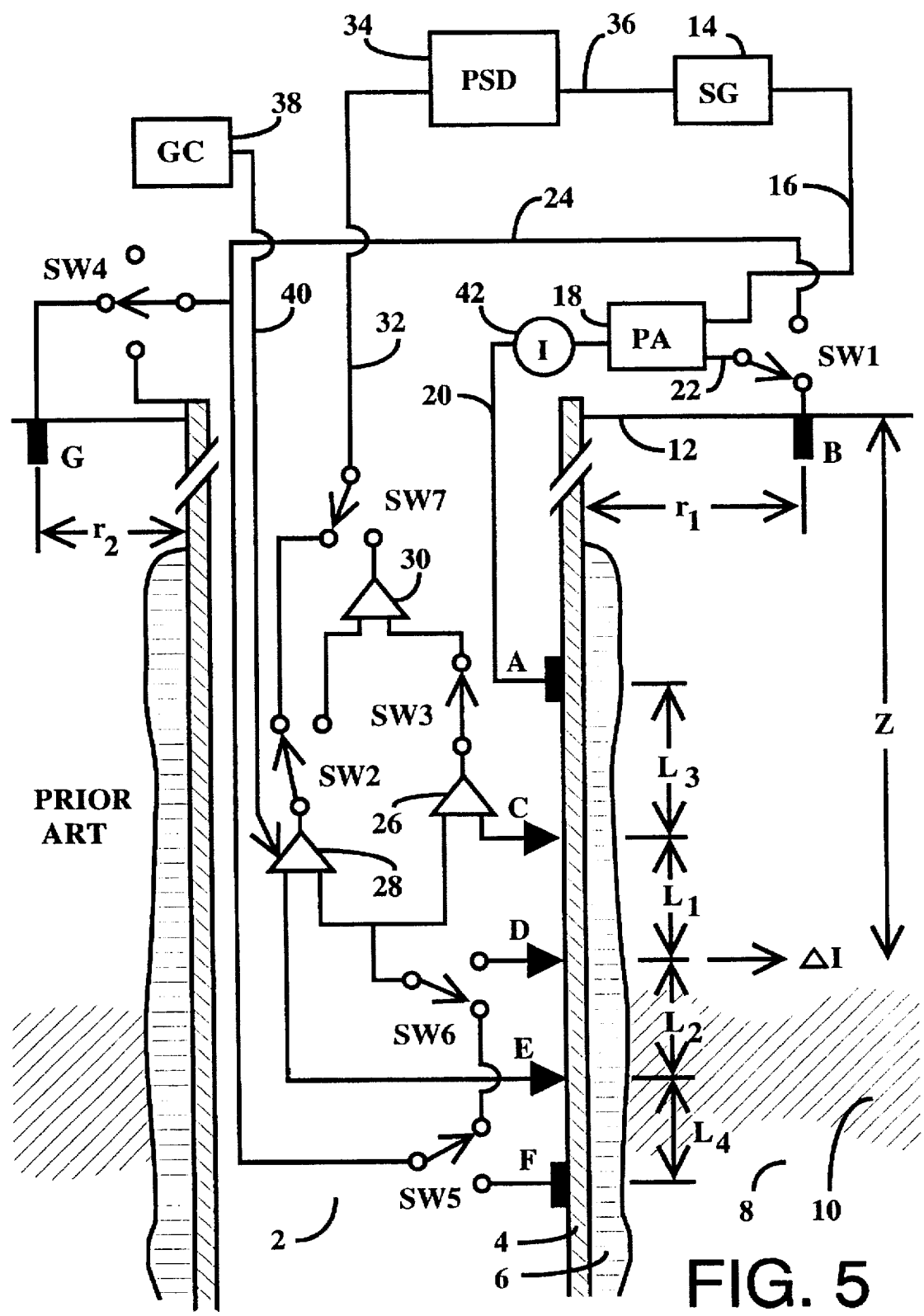
FIG. 5 is a sectional view of an embodiment of the invention which has electrodes which are separated by different distances and which shows explicitly how to measure $V_o$ that is marked with the legend "Prior Art".

Further quoting from Ser. No. 07/089,697 {Vail(542)}: "FIG. 4 is nearly identical to FIG. 1 except the electrodes C and D are separated by length $L_1$, electrodes D and E are separated by $L_2$, electrodes A and C are separated by $L_3$ and electrodes E and F are separated by the distance $L_4$. In addition, $r_1$ is the radial distance of separation of electrode B from the casing. And Z is the depth from the surface of the earth to electrode D. FIG. 5 is nearly identical to FIG. 3 except here too the distances $L_1$, $L_2$, $L_3$, $L_4$, $r_1$, and Z are explicitly shown. In addition, $r_2$ is also defined which is the radial distance from the casing to electrode G. As will be shown explicitly in later analysis, the invention will work well if $L_1$ and $L_2$ are not equal. And for many types of measurements, the distances $L_3$ and $L_4$ are not very important provided that they are not much larger in magnitude than $L_1$ and $L_2$."

It should be noted that the lower limit of the frequency at which the current leakage is measured may actually be as low as 0.01 Hz as claimed in PML's European Patent No. 0329709. As long as the frequency of operation satisfies the conditions best explained in FIGS. 10 through 21 of Ser. No. 07/089,697 {Vail(542)}, then the frequency of operation of the Through Casing Resistivity Tool will provide acceptable results. Even step-wise-changing D.C. values of current introduced to Electrode A can be used and the measurements properly performed.

The local casing potential voltage $V_o$ may be independently and separately measured at a variety of different frequencies spanning the frequency range from D.C. to 20 Hz provided that the measurements satisfy the requirements set forth in Ser. No. 07/089,696 {Vail(542)}. If D.C. is used, then the D.C. current is step-wise changed and the resulting step-wise changes in the potential voltage are measured. These statements have been proven to be true based on experimental evidence at actual wellsites.

Further quoting from page 16 of Ser. No. 07/089,697 {Vail(542)}: "As the frequency of the current I is increased, then eventually a frequency will be reached when most of the current simply flows from electrode A up the inside of the casing to the surface for a return to electrode B. This is caused by the skin effect of the pipe. The skin effect causes an exponential attenuation of the electric field applied across the thickness of the steel casing, where the electric field is attenuated as follows:

$$\xi = \xi_o e^{-(\tau_1/\delta)} \qquad \text{Eq. 21}$$

The electric field $\xi_o$ is that applied to the inside of the casing by electrode A, $\xi$ is the field immediately outside of the pipe, $\tau_1$ is the thickness of the pipe, and $\delta$ is the skin depth given by the following:

$$\delta = (\pi f u o)^{-\frac{1}{2}} \qquad \text{Eq. 22}$$

Here, f is the frequency in Hz, u is the magnetic permeability, and o is the conductivity of the material. (Please refer to 'Fields and Waves In Communication Electronics', Simon Ramo, et. al., Second Edition, John Wiley & Sons, 1984, p. 149.) Typical steel in borehole casing has a relatively permeability of 100, and the resistivity (1/o) of typical steel is 10 micro-ohm-cm. Therefore, the above formula becomes:

$$\delta = (0.62/f^{1/2}) \text{ inches} \qquad \text{Eq. 23}$$

The critical frequency is the frequency where the skin depth equals the thickness of the pipe in question. The critical frequency for a 0.50 inch wall thickness in 1.54 Hz. The critical frequency for a 0.375 inch wall thickness if 2.73 Hz. Typically casing has wall thickness between 0.25 and 0.50 inches. If the frequency of operation is significantly less than the critical frequency, then the results for resistivity measurements need not be corrected for skin depth phenomena. For frequencies above the critical frequency, then the resistivity results need to be corrected for such phenomena. For very high frequencies of operation, then none of the current is conducted through the pipe into the formation but instead goes up the inside of the pipe from electrode A for a return across the earth's surface to electrode B."

It should be noted that the above theory has been used successfully at the following wells: at the Research Well in Fort Worth, Tex.; in PML's Test Well in Woodinville, Wash.; and at the MWX-2 Well, in Rifle, Colo.

It is evident that the skin depth of metal structures may be chosen in a predetermined manner from Equation 22 of Ser. No. 07/089,697 {Vail(542)}. Therefore, very low frequencies, with SW1 in FIG. 1 connected to Electrode B, current conducted between Electrode A and B flows into the adjacent geological formations. At high frequencies, with SW1 connected to Electrode B, the current conducted between Electrode A and B flows up the inside of the casing to the surface for a return along the surface. For such a high frequency situation, the current flowing along the casing is mostly physically conducted in an interior portion of the wall thickness of the casing equal to the skin depth of the material calculated by Equation 22 for a subsequent return to Electrode B. Changing the frequencies from a low frequency to a high frequency is an example of varying the frequency to produce skin depth variations in portions of the casing inspected by the TCRT.

With SW1 in FIG. 1 connected to Electrode F, then current is conducted between Electrodes A and F along the casing. For low frequencies, the current flows through the entire material of the casing. For higher frequencies, the current flows within a skin depth thickness of the interior of the casing between Electrode A and F. It is again evident that varying the frequency of operation of the TCRT results in measurements responsive to different portions of the casing. The existence of the skin depth at higher frequencies makes the casings appear as circuit elements having a resistive component and an inductive component per unit length. These casings are also called "reactive casings".

Similar comments apply to causing currents to flow along pipelines for pipeline inspection purposes. However, in pipelines, currents may be introduced on the inside of the pipeline and on the outside of the pipeline at various different frequencies. Again, varying the frequency of the current conducted along the pipeline varies the skin depth which can be used for pipeline inspection purposes.

Various equations are of importance herein. Those equations were described in detail in Ser. No. 07/434,886 {Vail (626)} which states: "The average resistance of the casing between electrodes D and E is defined as the quantity $R_A$, which is given as follows:

$$R_A = (R_1 + R_2)/2 \qquad \text{Equation 1.}$$

Therefore, there is a departure from average resistance of the first section of the casing between electrodes C and D defined as $\Delta R_1$ such that:

$$R_1 = R_A + \Delta R_1 \qquad \text{Equation 2.}$$

Furthermore, there is a departure from the average resistance of the second section of the casing between electrodes D and E defined as $\Delta R_2$ such that:

$$R_2 = R_A + \Delta R_2 \qquad \text{Equation 3.}$$

In the Preferred Null State of the apparatus, a current called the Null Current (defined as "$I_N$") is passed along the casing between electrodes C and E. Since relatively litter current is expected to flow through formation in this state, then essentially the same current $I_N$ flows between electrodes C and D and between electrodes D and E. Therefore, the output voltage from amplifier 30 is this situation is defined as $V_N$, which is given by the following:

$$V_N = a_3 \{a_2 I_N (R_A + \Delta R_1) - a_1 I_N (R_A + \Delta R_2)\} \qquad \text{Equation 4."}$$

Equation 28 in Ser. No. 07/434,886 {Vail(626)} is used to calculate the current leakage $\delta i_2$. That equation is incorporated herein by reference. For simplicity, the quantity $\delta i_2$ shall henceforth be renamed herein as the quantity $\Delta I$. The quantity $\Delta I$ that is the current leakage is very important to calculate the apparent resistivity $\rho$ with the TCRT. The quantity $V_o$, the potential voltage, is described in that patent that is included herein by reference which is also important for measuring the apparent resistivity with the TCRT.

Equation 31 in Ser. No. 07,434,886 {Vail(626)} is repeated herein with the above definition of $\Delta I$ as follows:

$$R_c = V_o/\Delta I$$

Here, $R_c$ is the "contact resistance". The resistivity $\rho$ is then given by the following relationship that is Equation 33 in Ser. No. 07,434,886 {Vail(626)}:

$$\rho = K \, R_c$$

The parameter K is called the "Calibration Constant". Various methods have been used to calculate it and to determine it empirically. A closed form algebraic equation that appears to give reasonable agreement with empirically determined values of K is presented below as follows:

$$K = n \, L/2 \, Y \qquad \text{Equation 34.}$$

$$Y = \{Ln \, [(2 \, L/a) \, (1+X)] + a/2 \, L - X\} \qquad \text{Equation 35.}$$

$$X = [1 + (a/2 \, L)^2]^{1/2} \qquad \text{Equation 36.}$$

The equation numbers 34, 35, and 36 above are used to prevent any confusion with Equations No. 1 through 33 in Ser. No. 07,434,886 {Vail(626)}. Equation 3.24 on page 75 of *Earth Conduction Effects in Transmission Systems*, Sunde, E. D., 1949, D. Van Nostrand Company, Inc. New York, N.Y., was used in combination with the theory of the Through Casing Resistivity Tool set forth in The Vail Patents to obtain the above results. Here, L is the distance between Electrodes C and E. Here, L is twice the electrode spacing for evenly spaced Electrodes C, D, and E. The definition of L here applies solely to Equations 34, 35, and 36 and 37 herein. The parameter a is the radius of the pipe present that is the diameter d of the pipe divided by 2.

In the limit of L being much larger than d, and using other approximations, Equation 34 is then given by the following final approximation:

$$K = 2 \, n \, L/\{Ln \, 4 \, L/d\} \qquad \text{Equation 37.}$$

This same equation can be obtained from Equation 30 stated in Ser. No. 07/434,886 {Vail(626)} and Equation No. 6 in Ser. No. 06/927,115 {Vail(989)}.

Equations 34, 35, and 36 provide good agreement with the values of K empirically determined at wellsites including The Research Well in Forth Worth, Tex.; PML's Test Well in Woodinville, Wash.; and at the MWX-2 Well in Rifle, Colo.

It has been expected from theory that the Calibration Constant K should depend primarily on the electrode spacing distance and the diameter of the pipe as clearly shown in Equations 34, 35, 36 and 37 above. Very near the end of casing strings, or in thin formations, or if cement is present, certain corrections may be needed to be done to K. Such corrections made to the Calibration Constant K generate new constants defined as K(EFFECTIVE) abbreviated as K(EFF) to be used in place of K above. After those corrections are done, then a modified form of Equation 33 in Ser. No. 07/434,886 {Vail(626)} giving the resistivity ρ is to be used as follows:

$$\rho = K(EFF) R_c \qquad \text{Equation 38.}$$

It is sometimes helpful to clearly state that the apparent resistivity on the inside of the casing is being measured with the Through Casing Resistivity Tool. Therefore, Equation 38 can be re-written as follows where ρ (APP) is defined as the apparent resistivity being measured with the TCRT. Equation 38 then becomes:

$$\rho(APP) = K(EFF) R_c \qquad \text{Equation 39.}$$

Figure 6:
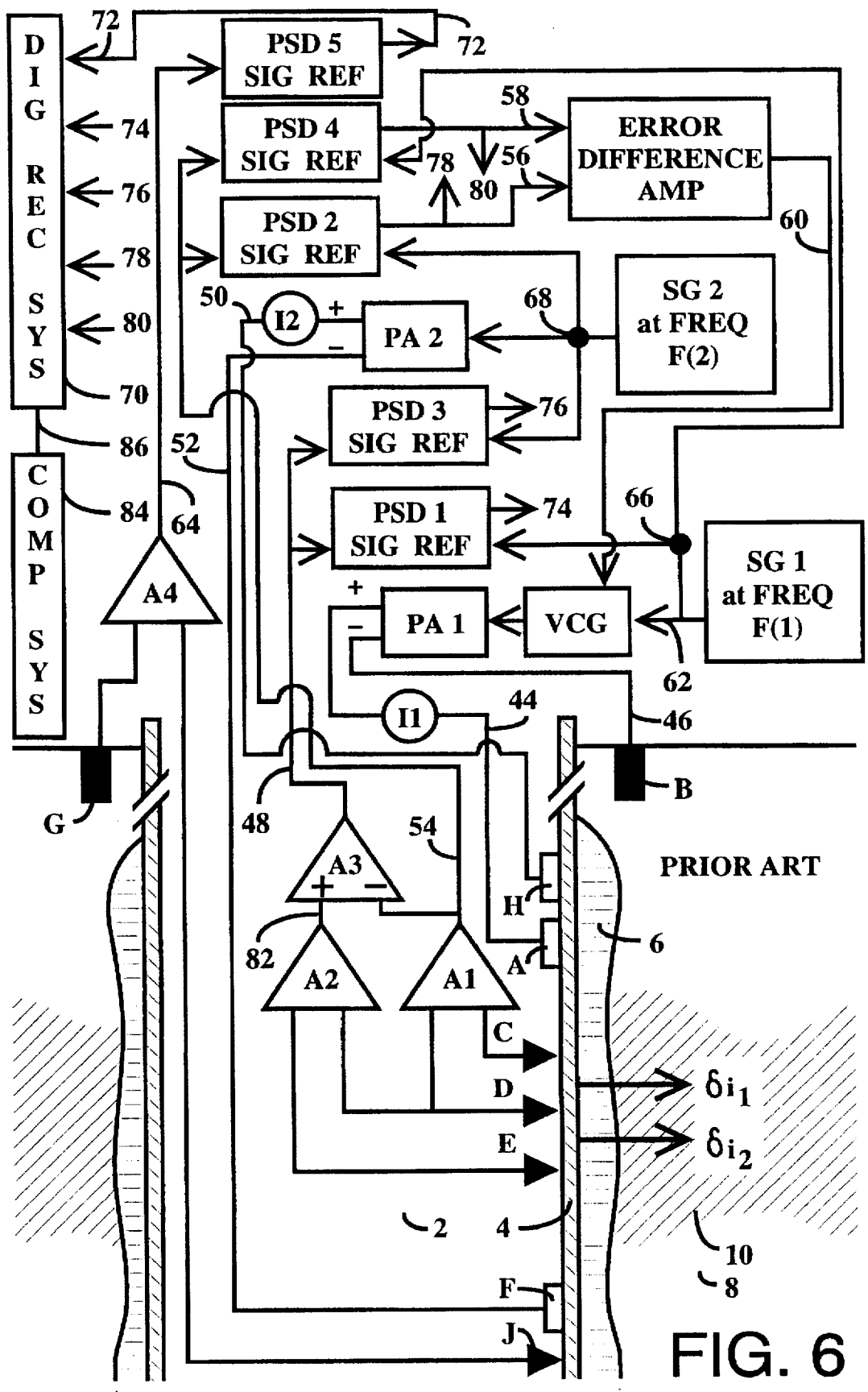
FIG. 6 is a sectional view of an embodiment of the invention which provides multi-frequency operation to compensate for errors of measurement marked with the legend "Prior Art".

Having completed the review of theory of the Through Casing Resistivity Tool, it is now necessary to describe FIG. 6 in detail. The apparatus in FIG. 6 is intended to allow measurements to be obtained with a continuously moving apparatus within the well that is a desirable feature in the oil well logging industry. FIG. 6 was first described in Ser. No. 07/434,886 {Vail(626)} which states: "For the purpose of logical introduction, the elements in FIG. 6 are first briefly compared to those in FIGS. 1–5. Elements No. 2, 4, 6, 8, and 10 have already been defined. Electrodes A, B, C, D, E, F, G and the distances $L_1$, $L_2$, $L_3$, and $L_4$ have already been described. The quantities $\delta i_1$ and $\delta i_2$, have already been defined in the above text. Amplifiers labeled with legends A1, A2, and A3 are analogous respectively to amplifiers 26, 28, and 30 defined in FIGS. 1, 3, 4, and 5. In addition, the apparatus in FIG. 6 provides for the following:

(a) two signal generators labeled with legends "SG 1 at Freq F(1)" and "SG 2 at Freq F(2)";

(b) two power amplifiers labeled with legends "PA 1" and "PA 2";

(c) a total of 5 phase sensitive detectors defined as "PSD 1", "PSD 2,", "PSD 3", "PSD 4", and "PSD 5", which respectively have inputs for measurement labeled as "SIG", which have inputs for reference signals labeled as "REF", which have outputs defined by lines having arrows pointing away from the respective units, and which are capable of rejecting all signal voltages at frequencies which are not equal to that provided by the respective reference signals;

(d) an "Error Difference Amp" so labeled with this legend in FIG. 6;

(e) an instrument which controls gain with voltage, typically called a "voltage controlled gain", which is labeled with legend "VCG";

(f) an additional current conducting electrode labeled with legend "H" (which is a distance $L_5$—not shown—above electrode A);

(g) an additional voltage measuring electrode labeled with legend J (which is a distance $L_6$—not shown—below electrode F);

(h) current measurement devices, or meters, labeled with legends "I1" and "I2";

(i) and differential voltage amplifier labeled with legend "A4" in FIG. 6."

Ser. No. 07/434,886 {Vail(626)} further describes various cables labeled with legends respectively 44, 46, 48, 50, 52, 54, 56, 58, 60, 62, and 64 whose functions are evident from FIG. 6.

Ser. No. 07/434,886 {Vail)626)} further states: "The outputs of PSD 1, 2, 3, and 4 are recorded on a digital recording system 70 labeled with legend "DIG REC SYS". The respective outputs of the phase sensitive detectors are connected to the respective inputs of the digital recording system in FIG. 6 according to the legends labeled with numbers 72, 74, 76, 78, and 80. One such connection is expressly shown in the case of element no. 72." Element 82 connects the output of amplifier A2 to the plus input of amplifier A3. The computer system 84 is connected to the digital recorder system by cable 86.

Ser. No. 07/434,886 {Vail(626)} teaches in great detail that it is necessary to accurately measure directly, or indirectly, the resistance between electrodes C–D (herein defined as "R1") and the resistance between electrodes D–E (herein defined as "R2") in FIGS. 1, 3, 4, 5 and 6 to precisely measure current leakage into formation and formation resistivity from within the cased well. Please refer to Equations 1–33 in Ser. No. 07/434,886 {Vail(626)} for a thorough explanation of this fact. The parent application, Ser. No. 06/927,115 {Vail(989)} and the following Continuation-in-Part application Ser. No. 07/089,697 {Vail(542)} taught that measurement of the resistance of the casing between voltage measurement electrodes that engage the interior of the casing are very important to measure formation resistivity from within the casing.

Using various different experimental techniques that result in current flow along the casing between current conducting electrodes A and F in FIGS. 1, 3, 4, 5, and 6 result in obtaining first compensation information related to a first casing resistance defined between voltage measurement electrodes C and D. Similarly, using various different experimental techniques that result in current flow along the casing between current conducting electrodes A and F in FIGS. 1, 3, 4, 5, and 6 result in obtaining second compensation information related to a second casing resistance between voltage measurement electrodes D and E. FIGS. 1, 3, 4, 5, and 6 all provide additional means to cause current to flow into formation, and the measurements performed while current is flowing into the formation is called the measurement information related to current flow into formation. Such measurement information is used to determine a magnitude relating to formation resistivity. Various other figures in the Vail Patents provide means to provide measurement information, and respectively first and second compensation information, along with additional information in several cases.

Various embodiments of the inventions in the Vail Patents provide many different manners to introduce current onto the casing, a portion of which is subsequently conducted through formation. Various embodiments in the Vail Patents provide many different methods to measure voltage levels at a plurality of many points on the casing to provide a potential voltage profile along the casing which may be interpreted to measure the current leaking off the exterior of the casing from within a finite vertical section of the casing. Regardless of the details of operation chosen however, many embodiments disclosed in the Vail Patents provide a minimum of 3 spaced apart voltage measurement electrode means that provides measurement information related to current flow into the geological formation, and respectively, first and second compensation information related to measurements of at least two separate casing resistances between the three spaced apart voltage measurement electrodes, wherein the measurement information and the first and second compensation information are used to determine a magnitude related to formation resistivity.

Now that the mathematics necessary to measure formation resistivity have been described, it is important to recall that one use for the instrument shown in FIG. 6 is to allow the TCRT to make measurements with the TCRT as it is continuously drawn upward in the well. This method of measurement requires at least a minimum amount of current delivered to casing by Electrode A to overcome noise associated with such upward motion. During extensive experiments with real logging tools and during simulations with devices known as "moving test jigs", we have determined that the Triboelectric Effect is responsible for considerable noise during upward movement of the tool in the well.

The dictionary describes "triboelectricity" as "An electrical charge produced by friction between two objects". Several authors seem to imply that triboelectricity is primarily related to effects involving insulating materials, such as rubbing plastic rods with cat's fur in elementary physics demonstrations. Such is the case implied in a section from the handbook of Linear Technology, Inc. Please refer to Linear Technology Inc., 1990 Linear Databook, pages 15–24.

However, it is known that metal contacts in motion act as a voltage sources. Quoting from the article entitled "Electrical Noise in Wire-Wound Potentiometers", Irving J. Hogan, Aug. 28, 1952, West Coast I.R.E. Convention, available from Beckman Instruments.: "When two dissimilar metals are rubbed together, a potential difference of constant polarity is developed between them. This has been named the "tribo effect" or "tribo emf" (from a Greek word meaning "to rub"). Very little is known about the origin and mechanics of the tribo emf; some investigators have identified it with the thermocouple effect, but others have denied this. The magnitude of the tribo emf encountered in precision wire-wound potentiometers is usually quite small, being on the order of tens or hundreds of microvolts, and depends on the relative velocity between the two metals, the contact force, the composition of the metals, the surface condition of the metals, and probably other, unknown factors." Maximum noise voltages from this effect quoted in that article are up to 200 to 300 microvolts. The basic size of the effect is quoted as ranging from microvolts to millivolts depending on circumstances.

An article entitled "Sliding Contacts to Transmit Small Signals", Billy M. Horton, The Review of Scientific Instruments, Volume 20, Number 12, December, 1949, page 930 states the following: "But even when practically no current is flowing through a sliding contact, electrical noise impulses still are generated by the sliding. Only this generated noise is considered here. Its origin will not be discussed except to say that is due partially to thermoelectric pulses from hot spots created by frictional heating and partially to effects of semi-conducting and insulating films. Its magnitude depends upon the materials used, the conditions of their surfaces, speed of sliding, normal force, and the number of contacts in parallel." Even with very clean, ideal gold and silver electrodes, noise voltages on the order of 300 nanovolts were observed.

The inventors have demonstrated the Triboelectric Effect on various metals with a small table top experiment. On clean steel, dragging one probe along the metal while holding the other probe fixed typically generate 50–100 microvolts D.C. on the inputs to an amplifier. On copper, similar movements result 10–30 microvolts D.C. with opposite sign for similar motion. These voltages are much larger than the potential voltages seen between one random point and another on the steel surface (which range no larger than 3–4 microvolts on a typical sample of steel). The point here is that two metals in contact and in motion generate a D.C. voltage which fluctuates or varies in time which masks the several nanovolt resolution the inventors are trying to achieve to perform measurements with the TCRT. Random noise is also created during dragging, but the most striking phenomenon is the existence of the net D.C. voltage. The iron oxide layer seems to function only as an electrical insulator, which unto itself does not apparently generate noise when the electrodes break through it. The inventors have also conducted experiments with prototype versions of the TCRT in wells and have observed similar phenomena from the Triboelectric Effect when the TCRT is pulled up vertically in the well.

For the purpose of discussions herein, the Triboelectric Effect involving moving electrodes explicitly includes any phenomena related to the Work Function of metals. For additional information concerning Work Functions, see for example the book entitled "The Modern Theory of Solids", Frederick Seitz, Ph.D., McGraw-Hill Book Company, Inc., New York, 1940.

The point is that the Triboelectric Effect causes very large voltages that can mask the signals from the TCRT produced by currents on the order of 5 amps conducted donwhole to Electrode A of the TCRT. Of course, if much larger currents could be conducted downhole, then the Triboelectric Effect could be overcome and continuous measurements made with the TCRT as shown in FIG. 6. However, the wireline logging industry typically uses 7 conductor wirelines, each wire of which can safely, and routinely, carry about 1 amp each. Many of the 7 conductors are used for other purposes so that conducting over about 5 amps downhole using a 7 conductor wireline appears to be difficult using wirelines currently used by the industry. The inventors have used a special large conductor wireline at various test wells to overcome this problem, but the industry would prefer to use standard 7 conductor wirelines. Therefore, because a continuously moving TCRT generates large amounts of Triboelectric Noise, then it is desirable to have the TCRT remain stationary in the well during measurements. However, it is very inconvenient and expensive in the wireline industry to alternatively stop and start the wireline drum. Therefore, the inventors have conducted experiments using a "Moving Test Jig" within a steel pipe in a laboratory to simulate measurements with the TCRT involving the a new method of measurement, the "Slider Method of Measurement".

As an example of a demonstration of the Slider Method of Measurement, the inventors demonstrated the following events transpiring in sequence involving the Moving Test Jig located inside the rusty test casing in a laboratory: (a) the Moving Test Jig was jerked forward about 10 inches in about 2 seconds causing much electrical noise; (b) the massive noise was terminated with a voltage limiter; (c) it took about 2 seconds for the electronics to recover; and then (d) two measurements of resistivity were performed using a time constant of 3 seconds. This sequence of events has shown that the measurement technique can meet commercially required measurements for the TCRT. In these particular measurements, the "massive noise" described in (b) appeared as noise at least 10 times larger than the measurements described in (d) so that it was evident when the Moving Test Jig was stationary or moving. The measurements in (b) and (d) were performed with phase sensitive detectors, examples of which are shown as element 34 in FIGS. 1, 3, 4, and 5 and elements 72, 74, 76, 78, 80 in FIG. 6. In the interest of brevity, the inventors do not present the data available from this and other similar experiments.

Therefore, it is very desirable to have the TCRT remain stationary during a duration of time necessary for a measurement of formation resistivity. The TCRT is attached to a wireline that is drawn upward in the well. Stopping, measuring, and then rotating the drum, stopping, measuring, etc. is known as a "station-to-station" measurement process that is very time consuming, causes inaccurate depth shifts because of wireline stretch, and is generally undesirable in the logging industry.

In general, the wireline logging industry desires "continuously moving tools". In the opinion of the inventors, what the logging industry fundamentally desires is that the wireline drum undergo continuous rotation as the TCRT is drawn upward in the well. Therefore, what is required by the practicality of the situation are the following operational features: (a) a continuously rotating wireline drum that continuously winds the wireline on the drum located on the logging truck at the surface; and (b) means to cause the TCRT to execute periodic, stick-slip motion to log a well at different vertical portions, where the TCRT alternatively lurches upward in the well between durations of time when the tool otherwise remains stationary in the well, during which stationary times the TCRT makes measurements of the resistivity of geological formations from within the cased well. This is the implementation of The Slider Method of Measurement defined above.

The period of the periodic motion can be described as the sum of the times during which the tool is stationary, "the dwell time", and the time during which the tool moves upward in the well, the "move time". Therefore, period= dwell time+move time. The sum of the dwell time and the movement time is the period during which the tool executes periodic, stick-slip motion. Here, "stick" means that the tool is stationary in the well. Then "slip" means that the tool is moving in the well.

Figure 7:
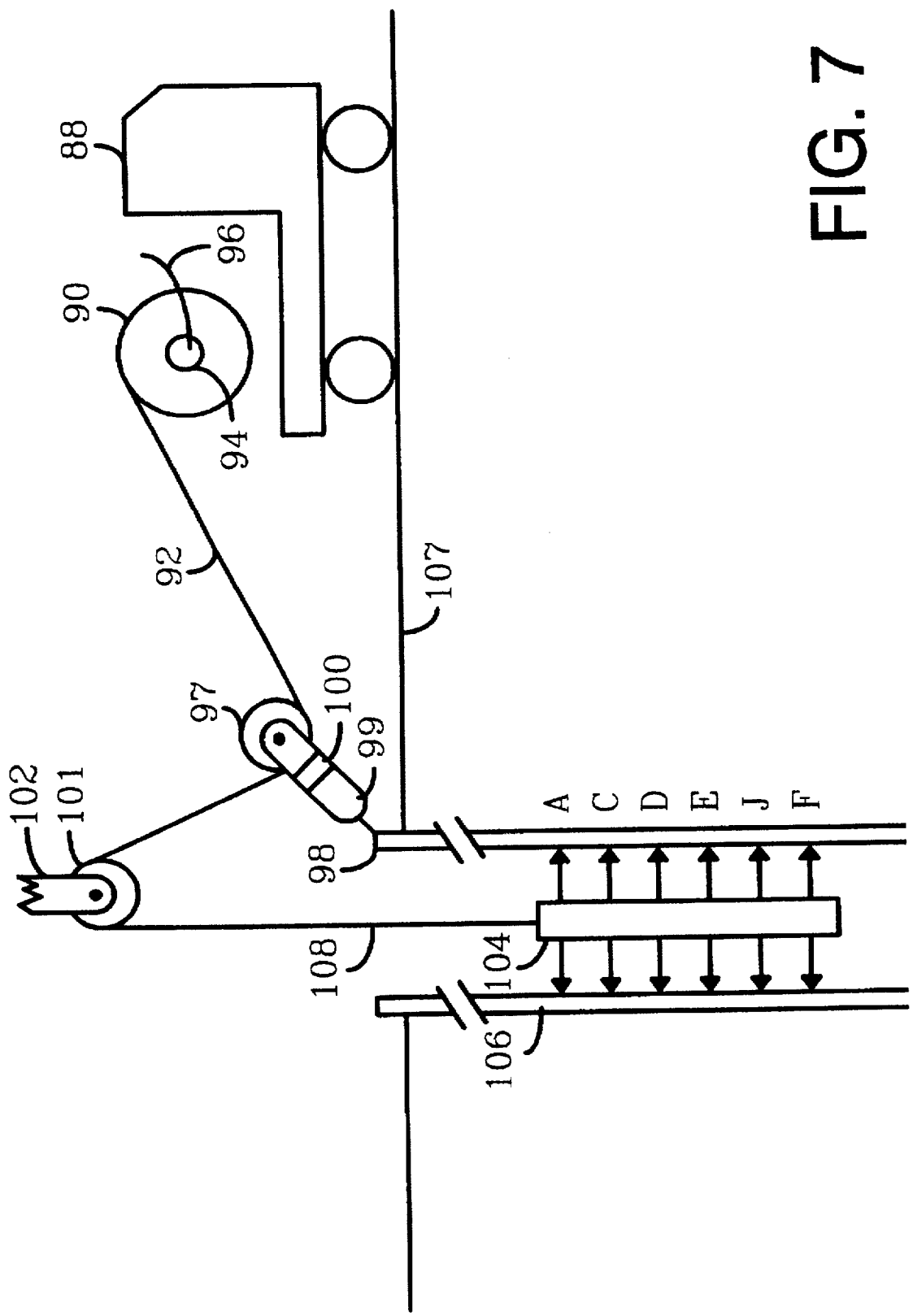
FIG. 7 is a wellsite diagram to describe stick-slip motion and the Slider Method of Measurement.
Figure 10:
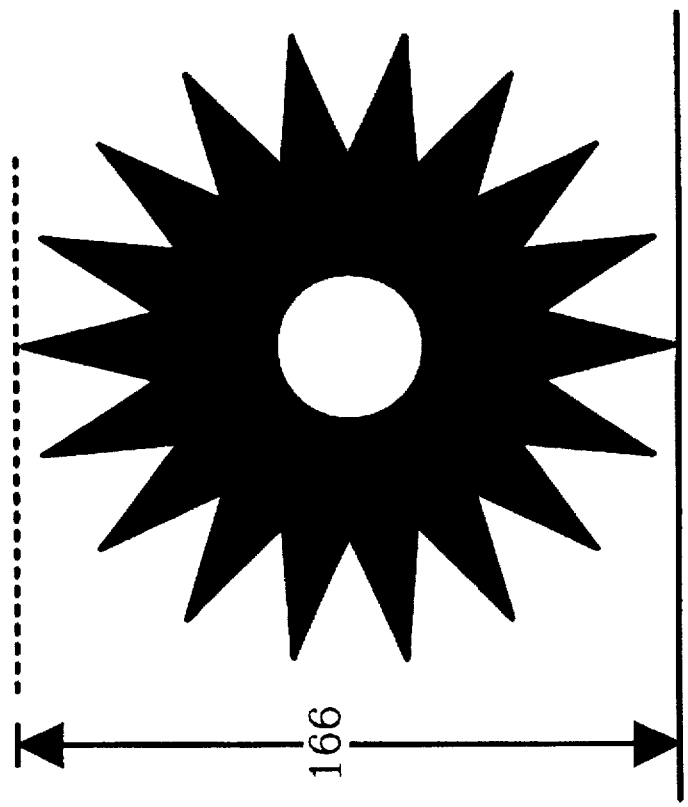
FIG. 10 shows spur-shaped rotating cutter electrodes oriented in the "one point down position".

To better describe stick-slip motion and the Slider Method of Measurement, please refer to FIG. 7. A logging truck 88 has a wireline drum 90 upon which the wireline 92 is wound. As is typical in the industry, the wireline is comprised of outer coatings of woven steel armor to support the weight of the tool and the weight of the wireline itself in the well. That woven armor surrounds one or more electrical conductors, for example 7 wires in 7 conductor wireline. Slip ring 94 provides the output from the 7 conductors in wire bundle 96. Lower sheave 97 is attached to the top of the cased well 98 by lower sheave support 99 having weight indicator 100. Upper sheave 101 is supported by upper sheave support 102 attached to the mast of a boom truck (not shown) using typical methods used by the industry of guiding the wireline into the well. Other types of workover rigs are also used in the industry to support the upper and lower sheaves. A Through Casing Resistivity Tool 104 is located in the cased well 106 disposed below the surface of the earth 107. The TCRT suspended by the end of the wireline 108 typically terminates in a cable-head (not shown). Electrodes A, C, D, E, J, and F of the TCRT are shown adjacent to lines terminating in arrows that represent the electrodes of the TCRT which make electrical contact with the interior of the casing.

Many different types of electrodes can be used to make the actual physical contact with the casing including, but not limited to the following: (a) triangular shaped carbide cutters of the type used to machine parts; (b) a rounded version of the former having a "hatchet face"; (c) spur-shaped rotating cutter electrodes of the type shown in FIG. 30 of Ser. No. 07/434,886 {Vail(542)}; and (d) spring-loaded spur-shaped rotating cutter electrodes where at least one spring is inserted between the rotating electrode and the tool body of the TCRT. There are many types. These are electrically isolated from the tool body using methods typically used in the industry or the methods used by the inventors at various test wells including at the MWX-2 Well in Rifle, Colo. Certain varieties of type (a) electrode were found to gouge the casing causing groves to be machined in the casing during upward movement of the tool. The oil industry does not appreciate damaged to casings. Therefore, the spur-shaped rotating cutter electrodes were used to avoid damaging the casing but otherwise make acceptable electrical contact to the casing.

However, for at least types (a), (b), (c) and (d) above, these electrode have one common feature experimentally verified by field trials. When the tool is initially stationary, the sticking friction holding the tool in place is larger than the rolling friction once the tool begins to move. However, once the tool begins to initially move, the rolling friction becomes less than the initial sticking friction.

For example, in recent field trials with a TCRT at the MWX-2 Well in Rifle, Colo. during late 1993 and early 1994, the TCRT there had electrodes corresponding to configuration (d) above. The inventors will describe a typical cycle of stick-slip motion observed with that tool. With the TCRT originally stationary at a first vertical portion within the well, the wireline drum started to rotate. At the MWX-2 well, there was a differential weight gauge attached to the lower sheave that reads the apparent weight of the tool and wireline at the surface. This differential weight gauge had been previously described as the "weight indicator 100" in FIG. 7 and the terms "differential weight gauge" and "weight indicator" shall be used interchangeably herein. As the upward force on the TCRT increased beyond the weight of the tool and the weight of the wireline in the well, the differential weight gage showed 0 pounds. Until about an extra 300 pounds were applied to the TCRT beyond that 0 pound reading, it would remain stationary in the well. Thereafter, it would typically "break-loose" and "lurch forward" or "lurch upward" in the well. The wireline itself acts like a large spring storing energy that is released to the tool during the upward motion in the well. The upward motion of the TCRT is eventually dissipated due to piston-like hydraulic damping in the fluid-filled well and other energy dissipative mechanisms. The upward motion ceases due to these energy dissipative mechanism and the tool comes to a rest.

From this description, it is evident that the "sticking friction" of that TCRT was about 300 pounds, and after it, the weight of the tool and the weight of the wireline were overcome, the tool would lurch forward. This lurch forward would show up as an immediate 300 pound drop in weight on the weight indicator defined earlier. The tool would typically lurch forward about 6 inches in this case. Very slow rotational speeds of the drum were used so that the tool would lurch forward about 6 inches typically every 30 seconds or so. Therefore, the tool would remain stationary during a dwell time of about 30 seconds in this example. It would only take several seconds for the tool to actually translate upward in the well the 6 inch distance once movement began. Here, the several seconds is called the "move time" and the 6 inches is called the "stroke". Naturally, there are statistical variations in the dwell times, the move times, and the stokes as the tool moves upward in the well that are subject to standard statistical analysis.

The inventors used the following two different methods at the MWX-2 Well to determine if the logging tool was stationary or moving. In the first method, the measurements performed with the appropriate phase sensitive detectors figuratively shown as elements 72, 74, 76, 78, 80 in FIG. 6 always provided sufficient information to determine if the tool was moving or stationary. The "massive noise" defined earlier produced during movement was at least 10 times greater than the nominal signal levels so that movement was evident. In the second method, the weight indicator 100 in FIG. 7 would show an immediate drop in weight of 300 pounds when the tool would break loose from its stationary position and lurch upward, or forward, in the well. Therefore, the inventors actually used at the MWX-2 Well the different methods of (a) using the signals measured by the TCRT and (b) a weight indicator to determine if the tool is stationary or moving. Either method proved adequate to determine if the tool were stationary or moving. The inventors had performed similar measurements with another tool at the Research Well in Fort Worth, Tex. and these same methods proved adequate for determine if the tool was stationary or moving.

From an initial stationary position in the well, the wireline drum rotates continuously until the weight of the tool, wireline, and the sticking friction of the electrodes are overcome. The tool was stationary for a dwell time of about 30 seconds, and the tool lurched upward by a 6 inch stroke to a new vertical position in a move time of about 2 seconds. This sequence of events was repeated periodically over and over again. The inventors call this periodic motion "stick-slip motion" because the sticking friction of the tool must be overcome before the tool can "slip" forward.

It is important to note that when the tool breaks loose after the sticking friction is overcome, that it is necessary that the rolling friction initially be less than the original sticking friction. This difference between the sticking friction and rolling friction allows the tool to slip forward during the stoke. Put another way, suppose that the rolling friction was greater than the sticking friction and that there were no other effects to consider. Then, the tool would simply be drug vertically and continuously by the wireline and the tool would not undergo stick-slip motion. Therefore, it is important that the electrode means electrically engaging the casing have the property that their rolling friction be less than their sticking friction to enable stick-slip motion to develop.

Measurements can be performed with the TCRT during a dwell time when the tool is stationary in the well. Periodically performing measurements with the TCRT at different vertical positions in the well during periodic dwell times after the tool performs successive stick-slip movements is called The Slider Method of Measurement.

The example at the MWX-2 Well used the stretch in the wireline itself at a depth of about 5,000 feet to store energy as the winch pulled up on the wireline. In this case, the wireline itself acted like a big spring. It stored energy until the sticking fraction of the TCRT was overcome. That energy was initially transferred into upward kinetic energy of the tool that was rapidly damped out by energy dissipative mechanisms including hydraulic piston-like dampening mechanisms acting on the tool in the fluid filled well. However, if the tool were very close to the surface, the wireline might not act like a good enough spring to provide adequate stick-slip motion. Therefore, a "Slider Mechanism" can be added to a tool string to effective cause stick-slip motion under general circumstances.

FIG. 8a shows a TCRT with a Slider Mechanism installed. Wireline 110 is connected to Cable Head 112. Thereafter in sequence along the length of the TCRT with Slider Mechanism installed are the following: First Optional Bowstring Centralizer 114; Mass Isolator 116 that electrically isolates the remainder of the tool string from the wireline; First Optional Dummy Mass with Baffles 118; Slider Mechanism 120; First Electronics Housing 122; Second Electronics Housing 124; Upper Current Electrode A, 126; Voltage Measurement Section with Voltage Measurement Electrodes C, D, E, and J, 128; Lower Current Electrode F, 130, with Hydraulic Reservoir and Pump 132; Optional Stick-Slip Arm Assemblies 134; Second Option Dummy Mass with Baffles, 136; Second Optional Bowstring Centralizer, 138; and Bull Plug, 140.

Typically, Upper Fixed Arm 142 and Lower Spring-Loaded Arm 144 support a spur-shaped rotating cutter electrode 146. (The spring inside Spring-Loaded Arm 144 is not shown on this diagram, although arm 144 will compress if sufficient force is applied to the arm.) In the tool used at the MWX-2 Well, Upper Fixed Arm 142 and Lower Spring-Loaded Arm 144 of each electrode assembly were actuated with Fauskatrons, a type of hydraulic mechanism suitable for this purpose. Any suitable arm deployment mechanism used in the wireline logging industry including any hydraulic or electric motor deployment mechanism is suitable for the invention described herein.

The Slider Mechanism 120 has Slider Housing 148, Slider Piston 150, Slider Spring 152, and the Lower Surface of the Slider Housing 154. As the wireline pulls up on the tool, the Slider Spring is stretched until the Slider Piston bottoms out on the Lower Surface of the Slider Housing—at which time the tool breaks loose, and lurches upward in the well. (It is evident that the Slider Mechanism can equally be designed to compress a spring, but that is a minor variation of the invention described herein and is not explicitly shown in a figure.) The detailed motion of the tool is dependent at least on the pull on the wireline at the surface; the rate of travel of the wireline being wound up on the wireline drum as it continuously rotates at the surface at an angular frequency; the weight of the tool; the weight of the wireline in the well at depth; the spring constant of the Slider Spring; the geometry of the Slider Mechanism including the length of Slider Housing and the length of the Slider Piston; the spring constant of the wireline at the vertical position in question; the detailed shapes of the spur-shaped rotating cutter electrodes and the forces which they are jammed against the casing to make electrical contact; the springs and their forces in the Lower Spring Loaded Arms; the presence or absence of baffles and other hydraulic damping features of the tool along its length; the I.D. of the cased well; the viscosity of the fluid in the well, to name a few. If the other variables are fixed, Optional Stick-Slip Arm Assemblies can be used to make adjustments of the dwell time, the move time, and the stroke. In addition, First and Second Dummy Masses with Baffles can be used to experimentally make adjustments of the dwell time, the move time, and the stroke at the wellsite. Here, baffles (not shown in FIG. 9 to avoid complexity) are devices having areas exposed to the borehole fluid that act as fluid damping pistons in the well. These baffles may or may not have holes in them to adjust their drag in the borehole fluid during motion of the tool in the well.

Element 156 figuratively represents in FIG. 8b an assembly comprised of an Upper Fixed Arm 142 and Lower Spring-Loaded Arm 144 that supports a spur-shaped rotating cutter electrode 146. The spur-shaped electrodes are electrically isolated from the respective Upper Fixed Arm 142 and the Lower Spring-Loaded Arm 144 using typical means used in the industry or the means actually used by the inventors at the MWX-2 Well in Rifle, Colo. during field trials in late 1993 and early 1994.

Element 158 figuratively represents in FIG. 8c a Solid Heavy-Duty Fixed Arm 160 having spur-shaped electrodes 162 that are NOT necessarily electrically isolated from the tool body. These are part of the Optional Stick-Slip Arm Assemblies 134 used to control the dwell time, the move time, and the stroke for the choice of the other variables above. These are examples of mechanical means to cause stick-slip motion of the TCRT.

The point is, that by using the Slider Mechanism, it is possible to make the TCRT with Slider Mechanism undergo stick-slip motion as the wireline is continuously wound up on the drum on the surface. Measurements of formation resistivity may be made during the dwell times during the stick-slip motion. Predetermined choices of the above variables described in this paragraph allow the operator to choose the dwell time, move time, and stroke of the tool in any well necessary to properly measure formation resistivity from within the cased well.

Figure 9:
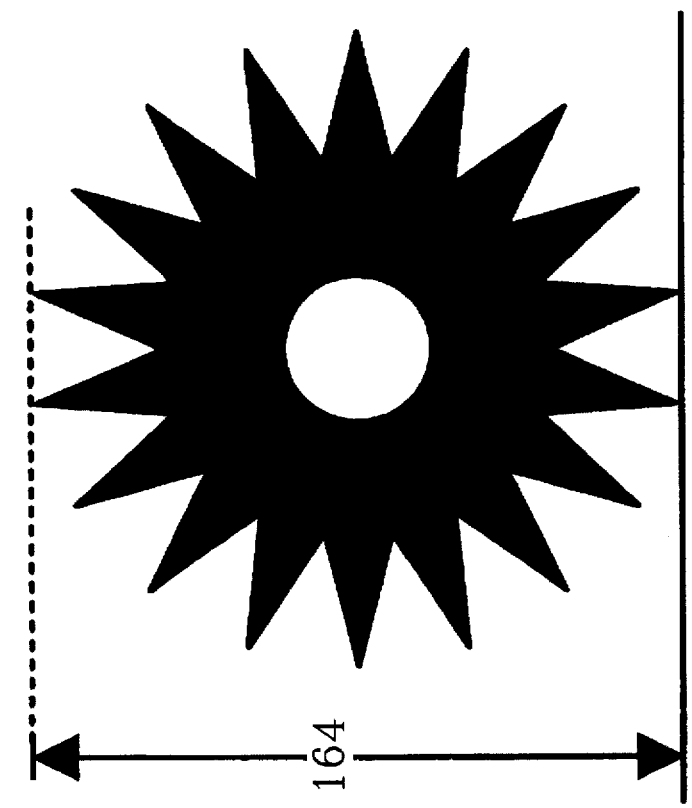
FIG. 9 shows spur-shaped rotating cutter electrodes oriented in the "two points down position".

The spur-shaped rotating cutter electrodes have their own virtues that are helpful to design the dwell time, move time, and stroke of the TCRT undergoing stick-slip motion. FIG. 9 shows a side view of the spur-shaped rotating cutter electrodes of the type used for experiments at the MWX-2 Well in Rifle, Colo. during late 1993 and early 1994. It is found from experiments with our Moving Test Jig, that the rotating cutter electrodes often come to rest with "two points down position" as shown in FIG. 9. The distance from one side to another in this particular position is shown as element 164 hereinafter defined for algebraic analysis herein as the symbol "x". Before the tool can lurch forward, the rotating cutter must rotate through the position of "one point down position" shown in FIG. 10. The distance from one side to another in this particular position is shown as element 166 hereinafter defined for algebraic analysis herein as the symbol "y". For those spur-shaped rotating cutters typically used at the MWX-2 Well, x=1.226 inches and y=1.245 inches. That means that the center of the rotating cutter electrode must lift up a distance of about 0.010 inches before the tool can lurch forward. If a heavy spring holds the rotating cutter against the casing, then before the tool can lurch forward, IT MUST COMPRESS THE SPRING A DISTANCE OF 0.010 inches. For example, the Lower Spring-Loaded Arm 142 in FIG. 8 has a spring within that arm (not shown) that would be compressed by 0.010 inches before the tool could lurch forward. By choosing the correct spring constant for the spring in the Spring-Loaded Arm 142, the STICKING FRICTION OF THE TOOL CAN BE INTENTIONALLY DESIGNED AND CHOSEN BY THE ENGINEER. By choosing different geometries of spur-shaped rotating cutter electrodes, different number of teeth, different diameters, the STICKING FRICTION OF THE TOOL CAN THEREFORE BE DESIGNED AND CHOSEN BY THE ENGINEER.

Therefore, electrode means that electrically engage the casing have been described which produce sticking friction and rolling friction than can be intentionally chosen and designed by the engineer to provide a predetermined dwell time, move time, and stroke of the tool within any given well.

It should also be noted that many tools used in the wireline logging industry make better measurements when stationary in the well. Particular examples of such tools are the pulse neutron capture tools ("PNC tools") such as the TDT-P (Mark of Schlumberger); the PDK-100 (Mark of Western Atlas Logging Services); and the TMD-L (Mark of Halliburton Logging Services). Other examples include the pulsed neutron spectral tools ("PNS tools") such as the RST (Mark of Schlumberger). Analogous mechanical additions may be made to such tools to provide means which mechanically engage the casing which also have the property that their sticking friction when stopped exceeds their rolling friction when moving. From the above specification, it is evident that many different types of mechanical means may be designed and suitably added to existing or new tools in the industry to mechanically engage the casing that have the property that their sticking friction when stopped exceeds their rolling friction when moving. Therefore, many different mechanical means can be used to produce the desired stick-slip motion in any logging tool. Consequently, any logging tool in the wireline industry can be made to execute stick-slip motion while the wireline drum continuously winds up the wireline on the surface. In this way, normal station-to-station tools can be effectively turned into "continuous tools" that are highly desirable to the logging industry.

Therefore, means may be added to any particular "station-to-station logging tool" to turn it into "a continuous logging tool", where "continuous" means that the wireline drum continually rotates while the tool undergoes stick-slip motion downhole and measurements are performed during the dwell times when the tool is momentarily stationary.

While the above description contains many specificities, these should not be construed as limitations on the scope of the invention, but rather as exemplification of preferred embodiments thereto. As has been briefly described, there are many possible variations. Accordingly, the scope of the invention should be determined not only by the embodiments illustrated, but by the appended claims and their legal equivalents.

What is claimed is:

1. An apparatus for logging a cased well comprising:
   a logging truck having a wireline drum capable of continuous rotation;
   a wireline with one end wound on said wireline drum;
   a wireline with the other end attached to a logging tool disposed within the cased well;
   a logging tool suspended in the well that is capable of performing measurements of formation resistivity from within the cased well only while the tool is stationary within the well;
   said logging tool having electrode means which electrically engage the casing for measurements of formation resistivity when the tool is stationary within the well;
   said electrode means producing sticking friction within the cased well when said tool is at rest;
   said electrode means producing rolling friction within said cased well when the tool is moving;
   whereby when said tool is at rest, said electrode means produces sticking friction that exceeds the magnitude of the rolling friction produced by said electrode means;
   whereby eventually the continuously rotating wireline drum results in an upward force by the wireline at the surface on the logging tool that eventually exceeds the combined weight of the tool, the weight of the wireline in the well, and the sticking friction of the logging tool;
   whereby when said tool initially begins movement after being stationary, said electrode means producing moving friction during the initial movement of the tool that is less than the magnitude of the sticking friction produced by said electrode means when the tool is stationary;

whereby said upward motion of the tool becomes eventually damped out due to hydraulic damping in the well and other energy dissipative mechanisms so that the tool eventually halts after moving vertically in the well;

whereby when the wireline is would up on a continuously rotating wireline drum, the tool executes periodic stick-slip motion whereby the tool alternatively comes to rest within the well during "dwell times" and alternatively moves vertically upward during a "move times";

whereby measurements of formation resistivity within the cased well at different vertical positions are obtained during each resulting dwell time so as to record resistivity of geological formations with a tool capable of measurements only when it is periodically stationary within the well which is drawn vertically with a continuously rotating wireline drum.

2. A method for logging a cased well with a logging tool suspended in the well by a wireline attached to a continuously rotating drum on a logging truck to measure formation resistivity from within a cased well with a tool capable of measuring said formation resistivity only when stationary which has electrode means which electrically engage the casing which electrode means also have the property that their sticking friction when stopped exceeds their rolling friction when moving, comprising the steps of:

continuously pulling up the wireline with a continuously rotating wireline drum on the wireline truck so as to produce stick-slip motion of the tool in the well whereby said tool alternatively comes to rest during dwell times between times of movement; and measuring formation resistivity with the logging tool at different vertical positions during said dwell times so as to log the well with a continuously rotating wireline drum.

3. A method for logging a cased well with a logging tool suspended in the well by a wireline attached to a continuously rotating drum on a logging truck to measure formation properties from within a cased well with a tool capable of measuring said formation properties only when stationary which has means which mechanically engage the casing which mechanical means also have the property that their sticking friction when stopped exceeds their rolling friction when moving, comprising the steps of:

continuously pulling up the wireline with a continuously rotating wireline drum on the wireline truck so as to produce stick-slip motion of the tool in the well whereby said tool alternatively comes to rest during dwell times between times of movement; and measuring formation properties with the logging tool at different vertical positions during said dwell times so as to log the well with a continuously rotating wireline drum.

4. An apparatus to log the resistivity of a cased well from within casing comprising:

a logging truck having a continuously rotating wireline drum;

a wireline with one end wound on said wireline drum;

a wireline with the other end attached to a logging tool disposed within the cased well;

electrode means mounted on said apparatus electrically engaging the casing causing the logging tool to execute stick-slip motion that causes the logging tool to move between successive stationary vertical positions within the well; and logging the well to measure formation resistivity during said successive stationary vertical positions so as to log a formation with a continuously rotating wireline drum.

5. An apparatus to log a well comprising:

a logging truck having a continuously rotating wireline drum;

a wireline with one end wound on said wireline drum;

a wireline with the other end attached to a logging tool disposed within the cased well;

mechanical means mechanically engaging the casing causing the logging tool to execute stick-slip motion causing the logging tool to move between successive stationary vertical positions within the well;

logging means to perform measurements during said successive stationary vertical positions so as to log a formation with a continuously rotating wireline drum.

* * * * *